United States Patent [19]

Plasek et al.

[11] Patent Number: 5,878,426
[45] Date of Patent: Mar. 2, 1999

[54] STATISTICAL DATABASE QUERY USING RANDOM SAMPLING OF RECORDS

[75] Inventors: James Michael Plasek; Ralph Edward Sipple, both of Shoreview, Minn.

[73] Assignee: Unisys Corporation, Blue Bell, Pa.

[21] Appl. No.: 771,851

[22] Filed: Dec. 23, 1996

[51] Int. Cl.[6] ........................................... G06F 17/30
[52] U.S. Cl. ............................. 707/102; 707/104
[58] Field of Search ........................... 707/102, 104; 705/10, 36

[56] References Cited

U.S. PATENT DOCUMENTS 5,270,957  12/1993  Murray ............................ 364/554
5,664,171   9/1997  Agrawal et al. .................... 707/2
5,675,786  10/1997  McKee et al. .................... 707/103

OTHER PUBLICATIONS

Ling et al, "An Evaluation of Sampling–Based Size Estimation Methods for Selections in Database Systems", IEEE, 1995 pp. 532–539.

Choobineh et al, "SQLSAMI SQL for Statistical Analysis and Modeling", IEEE, 1995 pp. 418–42.

Olken et al, "Maintenance of Materialized views of Sampling Queries", IEEE, 1992 pp. 632–641.

F. Olken et al., "Simple Random Sampling from Relational Databases," *Proceedings of the Twelfth International Conference on VLDB*, Kyoto, (Aug. 1986), pp. 160–169.

Hou, Wen–Chi et al., "Processing Aggregate Relational Queries with Hard Time Constraints," *Proceedings of the ACM SIGMOD Conference*, Oregon, (May 1989), pp. 68–77.

Gennady Antoshenkov, "Random Sampling from Pseudo––Ranked $B^{+Trees}$," *Proceedings of the 18th VLDB Conference*, Vancouver, (1992), pp. 375–382.

"TPC Benchmark™ D (Decision Support) Standard Specification Revision 1.0," Transaction Processing Performance Council (TPC), (May 5, 1995), pp. 1–134.

James M. Plasek, "Evaluation of Using Random Sampling for Executing SQL Queries." University of Minnesota Masters Degree Project, (Dec. 27, 1995), pp. 2–37.

*Primary Examiner*—Thomas G. Black
*Assistant Examiner*—John C. Loomis
*Attorney, Agent, or Firm*—Charles A. Johnson; Mark T. Starr; Merchant, Gould, Smith, Edell, Welter & Schmidt

[57] ABSTRACT

A system and method for expediting database queries by using random sampling. Data associated with a database attribute is partitioned into multiple data classes using a query language grouping command. Each of the data classes is randomly sampled on an individual basis to obtain a corresponding number of class data samples, each of which are stored in a separate sample database table. Database queries are then applied to each of the class data samples in the sample database table.

24 Claims, 8 Drawing Sheets

STATISTICAL DATABASE QUERY USING RANDOM SAMPLING OF RECORDS

FIELD OF THE INVENTION

This invention relates generally to database queries, and more particularly to a system and method for expediting database query results by using random sampling to execute database queries.

BACKGROUND OF THE INVENTION

Information system design is often accomplished through the use of database management systems (DBMS). A DBMS efficiently manages databases, which are shared pools of interrelated data. A DBMS typically provides a data manipulation language (DML), which includes a query language for allowing a user to retrieve and manipulate the data in the database.

Large databases not only provide a means to conveniently store and retrieve data, but also may be used as a decision tool. The collection and examination of large amounts of data can provide a wealth of information with respect to business trends and other business, educational, and scientific decisions. The use of these large databases in this manner typically involves analyses which are very computationally intensive, as various mathematical functions may be performed on a vast amount of data. The use of databases in this manner is often referred to as "decision support".

Due to the great number of computations which may be involved when using database technology as a decision support tool, it becomes clear that processing time may likewise be very high. This can be very undesirable for many reasons. An attempt to make expeditious business decisions can be frustrated where each hypothetical or "what if" query presented to the information system takes hours, or even days, to complete. Furthermore, as computer time carries monetary cost with it, these lengthy computations become prohibitively expensive.

Many of these types of analyses require only an approximate answer, as compared to the very precise answer obtainable by analyzing each and every piece of data. For these cases, only a small portion of the full set of data needs to be processed. As the data portion decreases, so does the computation time.

The present invention provides a method for determining approximate results of database queries, to an accuracy desired by the user. This provides for a decision support tool having the capability to provide very precise, as well as timely results. The present invention therefore provides a solution to the aforementioned problems, and offers other advantages over the prior art.

SUMMARY OF THE INVENTION

The present invention relates to a system and method for expediting database query results by using random sampling to execute database queries.

In accordance with one aspect of the invention, a method for obtaining decision support query results from a database table having multiple records is provided. An attribute of the database table is sampled, which results in a collection of sampled data. The sampled data represents some percentage of all of the data corresponding to that attribute in the database table. The data associated with the attribute includes multiple data classes, and the sampled data is separated or partitioned into these data classes. A database query is applied to the sampled data rather than to all of the data corresponding to that attribute in the database table.

In accordance with another aspect of the invention, a method is provided to obtain decision support query results from a database table where all of the data associated with a particular database attribute is grouped into various data classes. Each of the data classes is individually randomly sampled to obtain a corresponding number of class data samples. Each of the class data samples is then queried, which can include executing aggregation functions on each of the class data samples.

In accordance with yet another aspect of the invention, a method for providing result approximations in database queries is provided. Data associated with a database attribute is partitioned into multiple data classes using a structured query language (SQL) GROUP BY command. Each of the data classes is randomly sampled on an individual basis to obtain a corresponding number of class data samples, each of which are stored in a separate sample database table. Database queries are then applied to each of the class data samples in the sample database table using SQL commands.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
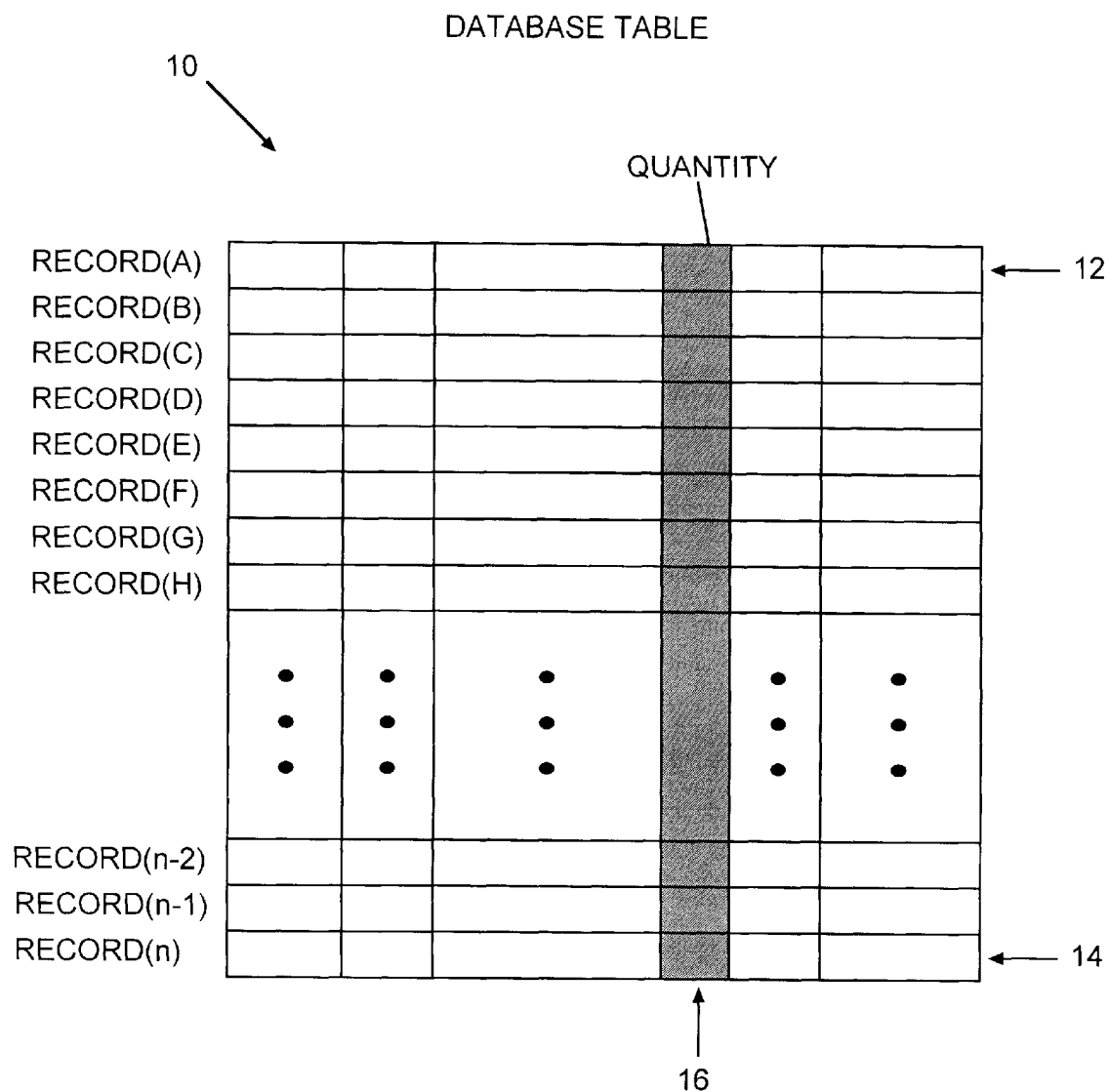
FIG. 1 is a diagram of a database table illustrating one manner in which mathematical aggregation functions can be executed on the database.

FIG. 1 is a diagram of a database table 10 illustrating one manner in which mathematical aggregation functions can be executed on the database. The database table 10 can represent various types of database structures, although in the example of FIG. 1 it is illustrated as a relation in a relational database.

A data model is an integrated set of tools used to describe the data and its structure, data relationships, and data constraints. Relational databases originated from the relational data model, which defines various data types, including the table (relation), the row (tuple), and the column (attribute). A collection of tables, or relations, make up the shared pool of interrelated data comprising the entire database. Within the tables are many records, or "tuples", shown in FIG. 1 as RECORD(A) 12 through RECORD(n) 14. Each record consists of one row in the table, which therefore includes data from each of the attributes, or columns, in the table. Each attribute is associated with an attribute name, such as the attribute name QUANTITY in column 16. A set of attribute names for the table is referred to as a relation scheme, or "schema". The database table 10 can have variable numbers of attributes in the relation scheme, and the number of records can be altered according to the number of record entries required.

A database management system (DBMS) is typically used to manage the database, and includes features such as DDL (data definition language) and DML (data manipulation language). The DDL defines the logical structure of the database, and is used to define the designed schemas and their relationships, and can therefore create new schemas and modify existing schemas which are stored in a data dictionary. The DML is used to query and update the database, and allows a user to retrieve, modify, insert and delete data from the database. A query is a manner in which a computer can be asked to search for information, often made by filling in blanks in higher level programs, or on a lower level by direct queries through a "query language". The DML includes a query language that deals with data retrieval, and can be stand-alone or embedded in a general purpose programming language such as C and COBOL. The most common query language used to express the relational model is the structured query language (SQL). SQL is a declarative, nonprocedural language, based on a large extent on relational algebra, that expresses the kind of data desired, not the way to get the data. Another more recent query language is the object query language (OQL). The use of queries represents an easier way to interrogate a database than using a general purpose programming language. SQL allows the database system to choose from alternative mechanisms and to obtain the desired results from the physical realization of the database. The DBMS can dynamically optimize the way queries are executed, freeing the application programmer from this task.

In a table such as the database table 10, it is often desirable or necessary to perform aggregation functions on one or more particular columns. For example, attribute QUANTITY in column 16 can be a quantitative value within each record of the table. Various aggregation functions, such as determining the sum, average, maximum and minimum, can be performed on the operational, changing data in column 16. In order to determine the average value of the data in column 16, for example, an SQL command AVG (QUANTITY) can be performed, which adds all of the values in column 16, and divides the result by the number of records. This provides an accurate average value, however it may be time consuming where the database is very large and therefore includes a very large number of records.

Figure 2A:
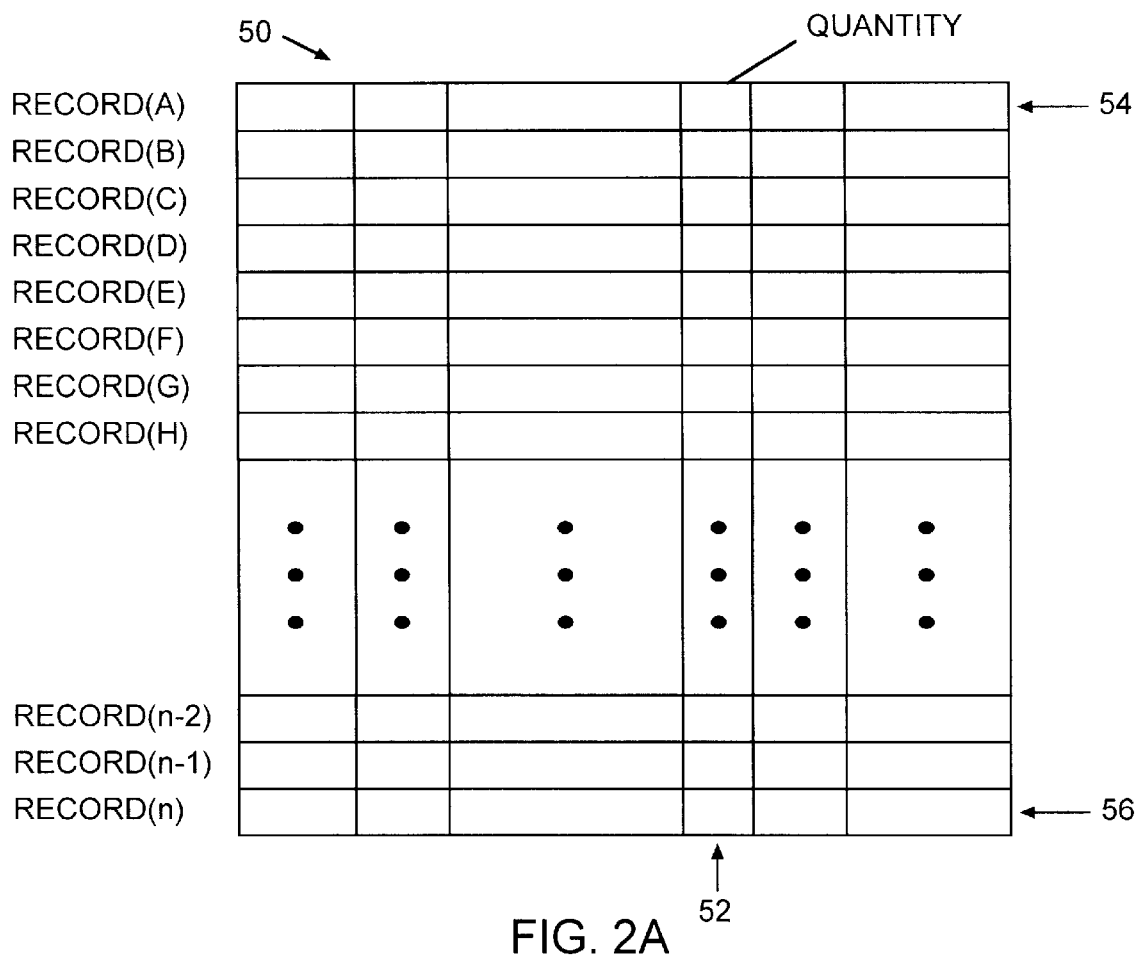
FIGS. 2A and 2B illustrate a multi-dimensional database (MDD) for obtaining the values typically obtained by executing aggregation functions.
Figure 2B:
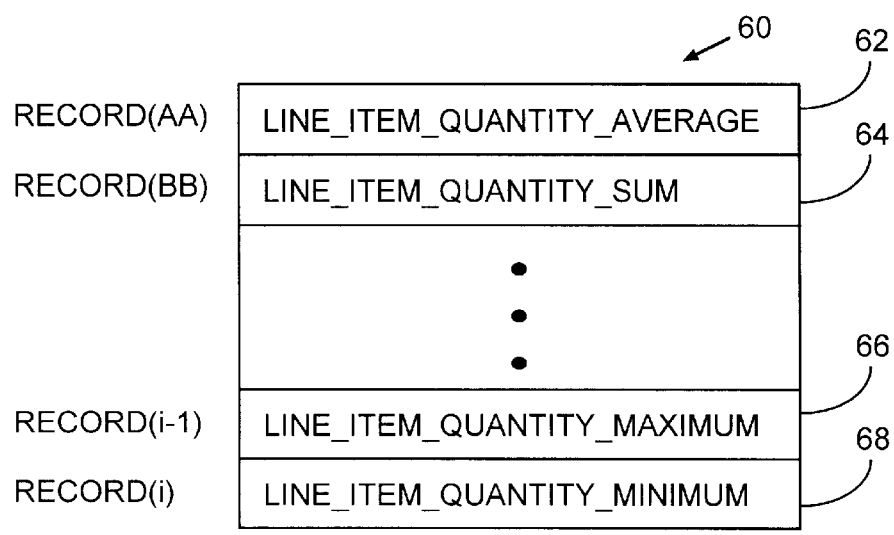

Another method of obtaining the values typically obtained by executing aggregation functions is illustrated in FIGS. 2A and 2B. Database table 50 of FIG. 2A is identical to database table 10, however rather than selecting each of the values in the QUANTITY column 52 from RECORD(A) 54 to RECORD(n) 56 to perform aggregation functions, preselected aggregation functions are periodically calculated. Such databases are referred to as multi-dimensional databases (MDD), and the aggregation functions are therefore not calculated on operational data, but are stored aggregation results from periodic calculations. These values are loaded at periodic or predetermined intervals into a separate table 60, shown in FIG. 2B. FIG. 2B includes multiple aggregation functions which have been preselected for a relation called LINE_ITEM, including a quantity column 52 average shown in RECORD(AA) 62, a quantity column 52 sum shown in RECORD(BB) 64, as well as other functions through the quantity column 52 maximum and minimum value shown in RECORD(i-1) 66 and RECORD(i) 68 respectively.

Figure 3:
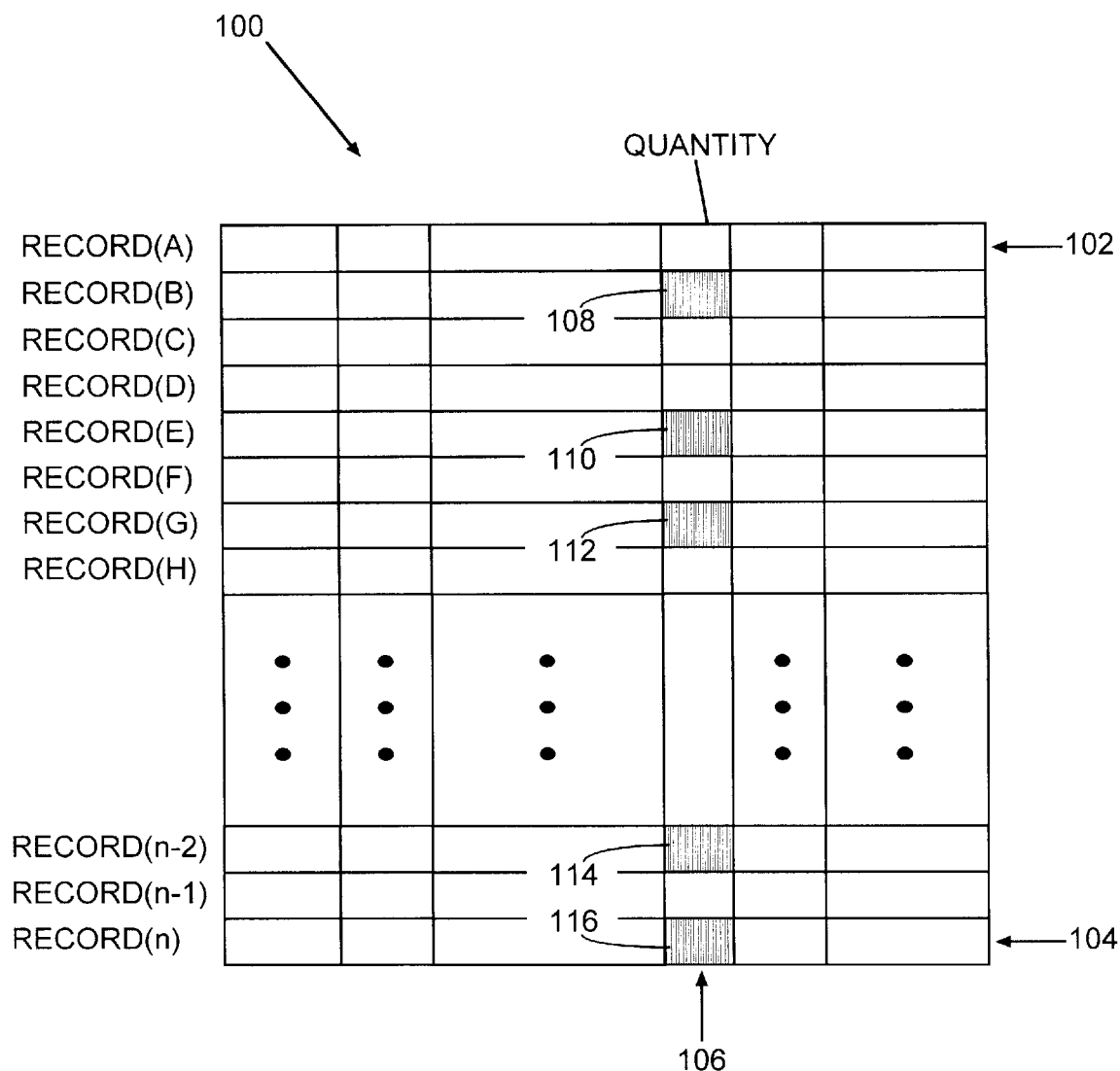
FIG. 3 is a database table illustrating one manner in which aggregation functions can be performed using statistical methods.

Referring now to FIG. 3, a database table 100 is provided, including RECORD(A) 102 through RECORD(n) 104, and again including the QUANTITY attribute in column 106. The database table 100 illustrates one manner in which aggregation functions can be performed using statistical methods. There are often times when an exact result of an aggregation function is not necessary or desired. Where quick, yet less accurate results are acceptable, it may be undesirable to perform the aggregation functions on all of the records in the database, as the time to perform an aggregation function on a very large table can take hours or days as opposed to seconds or minutes on a statistical "sample" of the data. Furthermore, business decisions or strategies, as well as testing of query formulation, may be obtained by way of approximate answers rather than the more time-consuming precise answers. In other words, it may simply be too expensive in terms of computer time or resource usage to obtain the exact results.

For example, a particular problem or decision may require a search for certain patterns, but it may be difficult to specify the question. This process is heuristic. It is often important to obtain relatively fast results to initial inquiries in order to determine the desirability of probing further, or in order to understand how to redefine the query. By iteratively redefining queries quickly through the use of sampling, a user can adequately focus the query so that executing the query against the full set of data will be required less frequently, and will ultimately save computer usage.

In order to address this issue, statistical random sampling of particular attributes may be utilized to provide approximate, yet acceptable results. As is well known, a "sample" is a portion of the population selected to represent an entire population. A simple "random sample" is a sample of size n from a population of size N selected such that each possible sample of size n has the same probability of being selected. The "population" is the collection of all records of interest. Random sampling methods are generally known, and include associating a random number with the records of the table, so that a particular number of the records are selected randomly.

The concept of using sample data in order to draw conclusions about a population is referred to as a statistical inference, and FIG. 3 illustrates such a statistical inference, where a sampling of the QUANTITY values in column 106 is taken, and the aggregation functions are performed on the sample. Every cell or field in the QUANTITY column 106 therefore is not processed in determining an aggregation function result, as was true in the examples of FIG. 1 and FIG. 2. Instead, a random sample of the QUANTITY column 106 is taken, which is illustrated by the selected cells 108, 110, 112 through the end of the database table 100 including selected cells 114 and 116. Desired aggregation functions are then performed on all of the selected cells, which approximates results as if performed on the entire database table 100.

For example, to determine the average of a randomly sampled QUANTITY attribute, selected cells 108, 110, 112 through 114 and 116 are totaled and divided by the number of cells selected. This average will be an approximation of the average of all of the cells from the totality of records in the database table 100. Another slightly different example is to determine the sum of the QUANTITY column by first performing a random sampling of column 106. These selected cells can be totaled, to provide a sum for the randomly sampled cells. This sum can then be extrapolated to the entire database table 100 by multiplying the calculated sum by the ratio of total records to selected cells. These results will not be exact due to the use of samples, and the confidence in the results generally decrease as the sample size decreases. However, sample sizes in the range of hundreds to thousands from a population of millions, for example, do provide statistically significant and useful results.

Figure 4A:
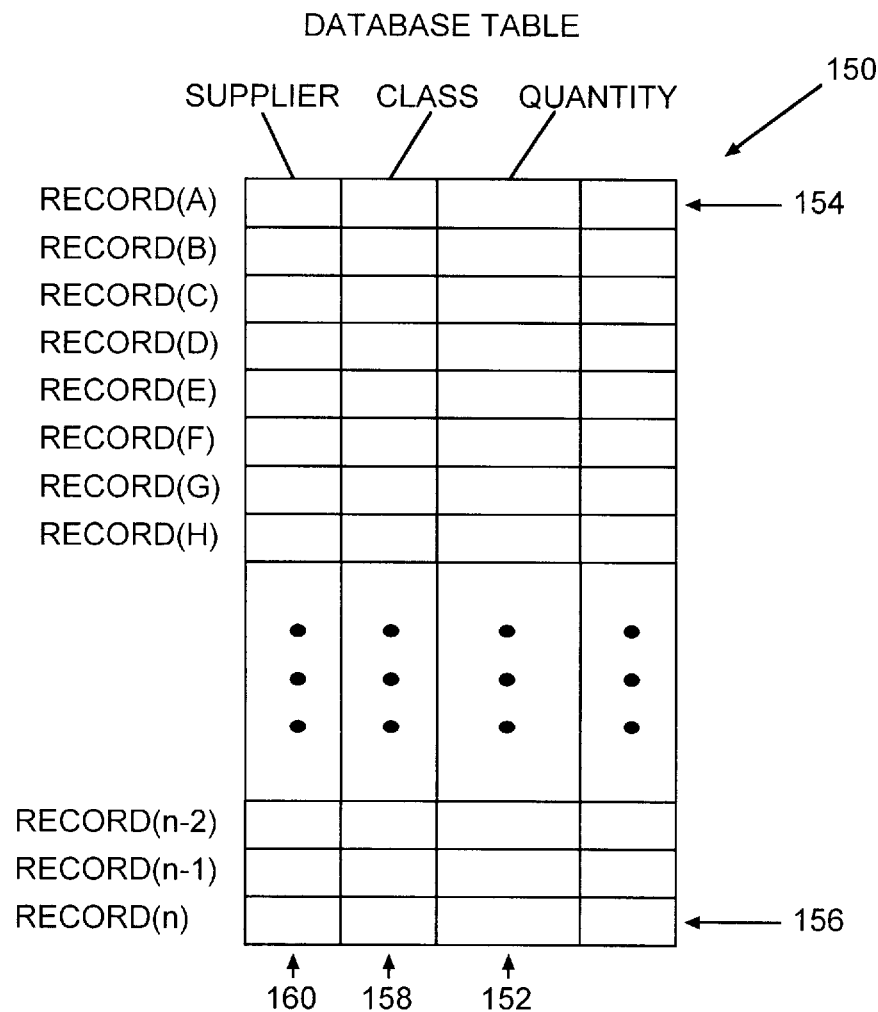
FIGS. 4A and 4B illustrate how a database table can be queried by various types within an attribute.

A question arises where multiple aggregation functions are to be performed for different classes of an attribute. Referring now to FIG. 4A, database table 150 is shown having an attribute QUANTITY in column 152 from RECORD(A) 154 to RECORD(n) 156. Also shown is the attribute CLASS in column 158, and attribute SUPPLIER from column 160. It may be desirable to execute queries and aggregation functions on different types associated with one or more particular attributes. For example, the SUPPLIER attribute may represent various product vendors, and the CLASS attribute may represent the state from which the product vendors ship widgets. Aggregation functions may be calculated for each CLASS (state) by dividing the CLASS into its respective states, and separately performing the aggregation functions on each CLASS.

In order to retrieve particular data associated with the execution of aggregation functions, a database query can be performed. As previously indicated, the most common query language used to express the relational model is the structured query language (SQL). Random sampling can therefore be used to execute an SQL query to perform the aggregation functions. SQL includes certain built-in aggregation functions, including SUM, COUNT, AVERAGE, MIN and MAX. Attribute names used for the categorization of records of a table by the values of a set of attributes are referred to as GROUP BY columns. Where the AVERAGE of the attribute QUANTITY is desired for each different CLASS, an SQL query can be formulated to add the QUANTITY values from column 152 for each distinct entry in the CLASS attribute. Such an SQL query could be formulated for a relation called LINE_ITEM as follows:

| | |
|---|---|
| SELECT | AVG (QUANTITY) |
| FROM | LINE_ITEM |
| GROUP BY | CLASS |

Figure 4B:
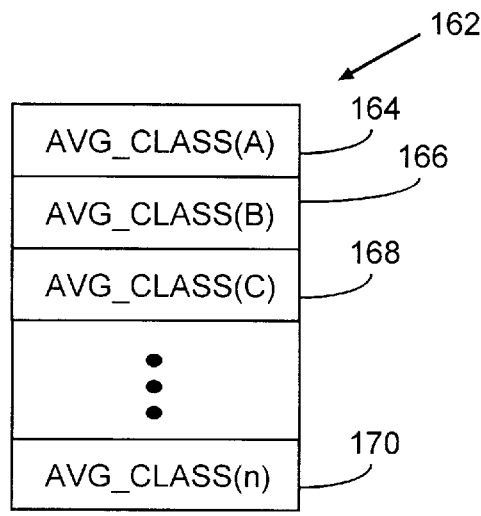

This SQL query would produce an average for each CLASS. For example, if the various classes were the states from which the product vendors ship widgets, an average would be calculated for CLASS(A) (e.g., Minnesota) and stored in the AVG_CLASS(A) record 164 of the relation 162 in FIG. 4B. Averages would also be calculated for the other classes (e.g., CLASS(B)=California, CLASS(C)=Wyoming, etc.), resulting in the corresponding AVG_CLASS(B) 166, AVG_CLASS(C) 168 through AVG_CLASS(n) 170 records in relation 162.

There may be instances where an exact result of an aggregation function associated with particular classes is not necessary or desired, even for each separate type in the CLASS. In such a case, random sampling can be used to determine approximate aggregation functions for each of the various types within the CLASS attribute in column 158, as is described in FIGS. 5 and 6.

Figure 5:
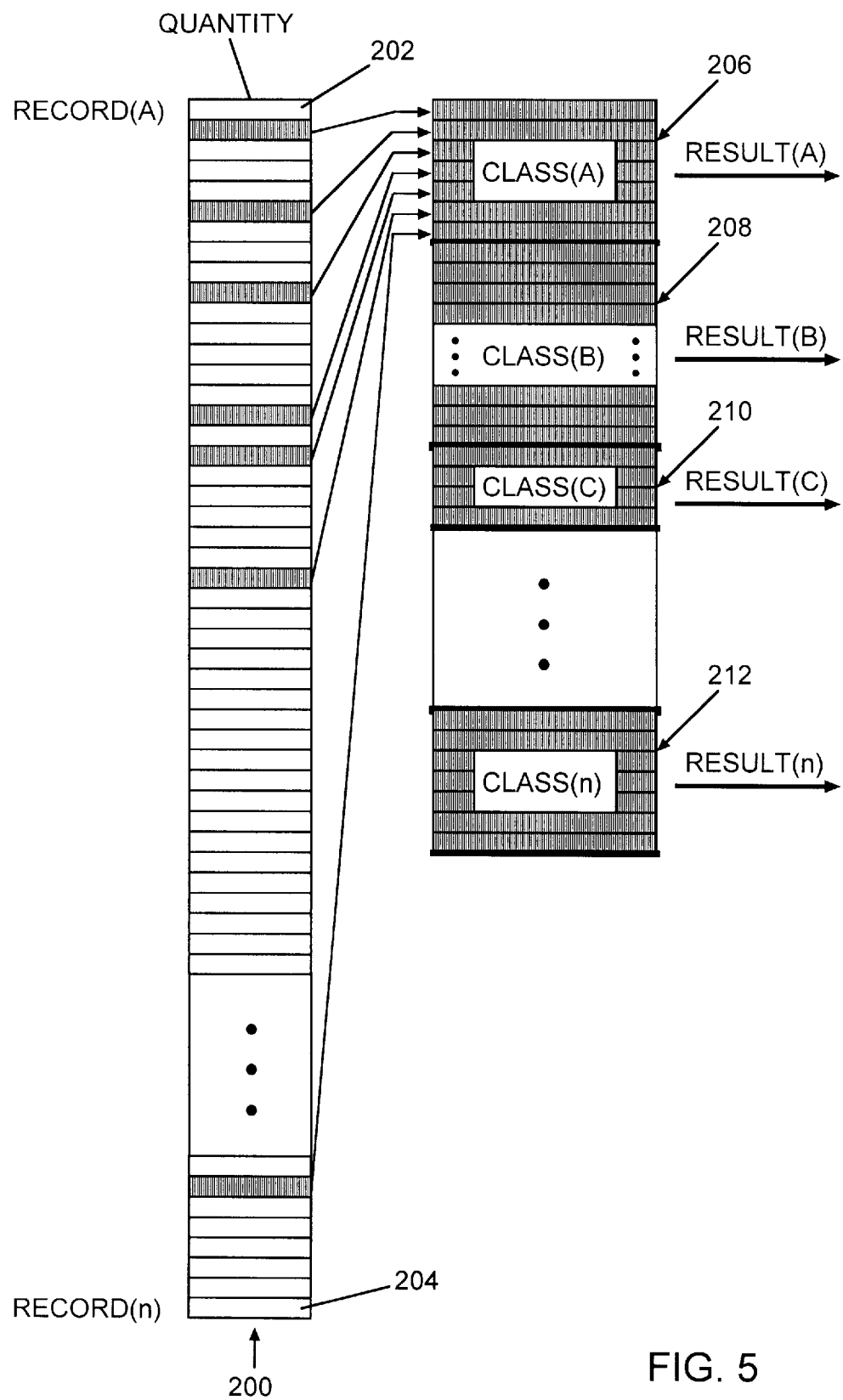
FIG. 5 is a diagram of a database attribute column which is randomly sampled and grouped into various attribute classes.

Referring now to FIG. 5, a QUANTITY attribute from column 200 from a particular table having n records, labeled RECORD(A) 202 through RECORD(n) 204 is shown. As is illustrated, an SQL GROUP BY clause may be used to distinguish among classes, as shown by CLASS(A) 206, CLASS(B) 208, CLASS(C) 210 through CLASS(n) 212. A random sample can be executed on column 200, and the resulting sample data grouped into the classes 206, 208, 210 through 212. Other query language grouping clauses, such as a group by clause used in the object query language (OQL), could similarly be applied to its data structure to take a random sample.

The actual gathering of samples from the database column is preferably accomplished through the use of a program written to extract a random sample from the database column. The program can accept input parameters to specify the accuracy or confidence level desired, from which the program can calculate the number of samples which need to be extracted to obtain the desired levels of accuracy and confidence. The program preferably utilizes random number generation to obtain the random sample.

When an aggregation function is executed against the sampled data in each of the classes, for instance in a 1% sample, the results may not be as accurate as the 1% sample may indicate. This is due to the potentially large variance in class size. For example, if CLASS(B) 208 represents an aggregation function for the grouping of QUANTITY for all widgets being shipped from California, and CLASS(C) 210 represents an aggregation function for the grouping of QUANTITY for all widgets being shipped from Wyoming, CLASS(B) 208 will be much larger than CLASS(C) 210. In fact, because there may be relatively few suppliers shipping widgets from Wyoming, the 1% random sample of the QUANTITY attribute 200 may not produce accurate results at all with respect to certain classes. Where the random sample is first performed on column 200, and the results of an aggregation function performed on that random sample are grouped using an SQL GROUP BY clause, the results for the smaller classes may be less accurate than expected for a 1% sample due to a correspondingly small sample size.

Figure 6:
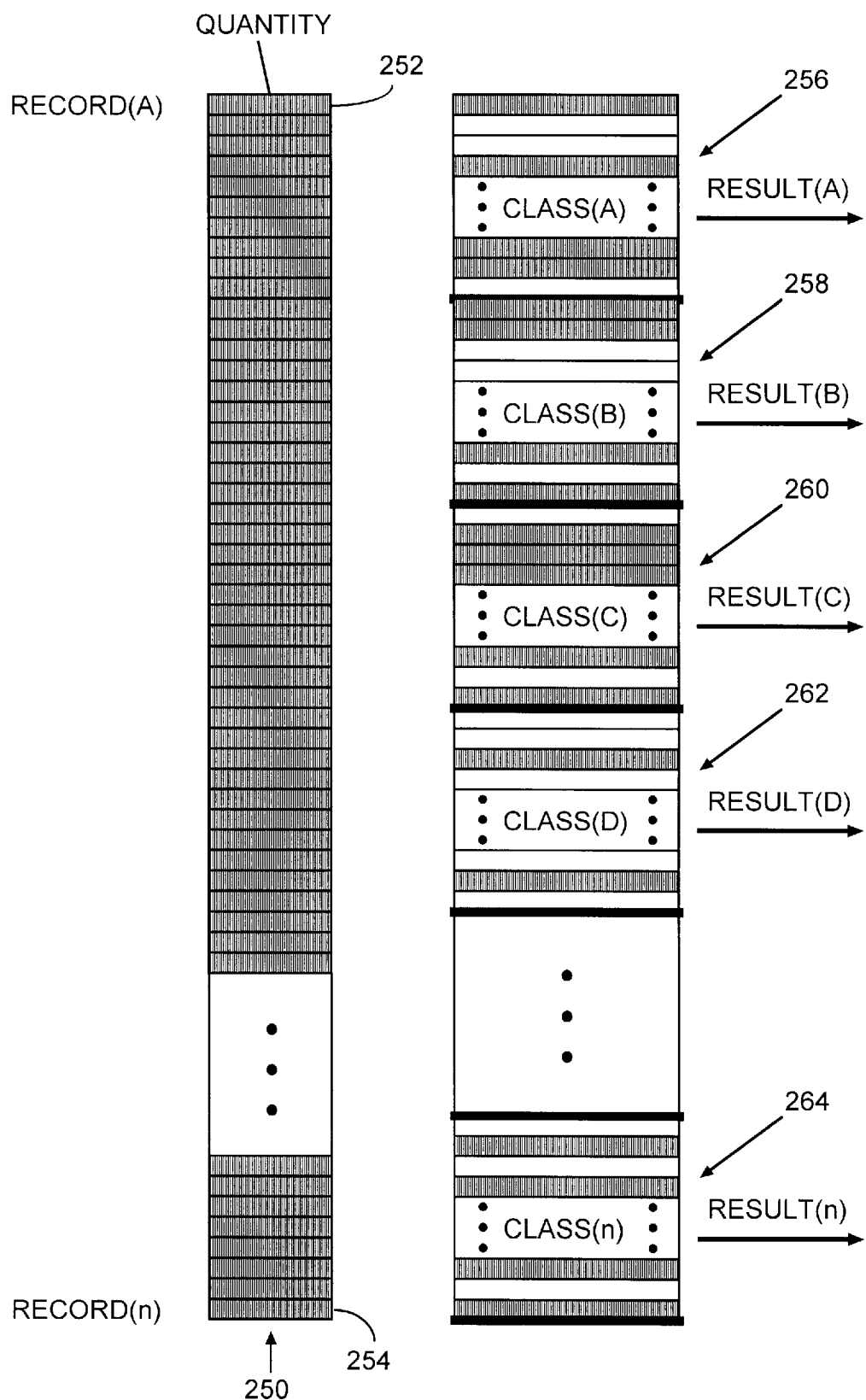
FIG. 6 is a diagram of a database attribute column which is grouped into various attribute classes, and further represents the individual random sampling of the resulting attribute classes.

The present invention provides for the use random sampling to execute queries, while providing accurate aggregation function results for all classes distinguished using query language grouping. It describes how to estimate the results of particular classes of queries, and particularly relational queries, using samples of data rather than the full set of data. FIG. 6 illustrates one manner in which the present invention executes a query yet provides more accurate aggregation function results.

In describing the invention, the TPC Benchmark™ D (TPC-D) will be referenced. The TPC-D benchmark allows customers to measure the performance of hardware/software transaction systems provided by various vendors of such systems. The systems provided by these vendors can be tested against the benchmark in order to allow those interested, such as potential customers, to compare the performance of these systems to each other. The characteristics of decision support and decision support queries are described herein and in the TPC BENCHMARK™ (Decision Support), Standard Specification Revision 1.0, May 5, 1995 published by the Transaction Processing Performance Council (TPC), the contents of which are incorporated herein by reference.

Because the TPC-D benchmark is generally known by those skilled in the art and is generally available, it will be used in illustrating the benefits of the present invention. Also, the invention illustrates how various business questions posed by the TPC-D benchmark can be answered using random sampling, though not to the exact level of accuracy specified by TPC-D.

The TPC-D benchmark is a price/performance benchmark for decision support. The business modeled is one that manages, sells, or distributes a product world-wide. The benchmark defines the tables and the records which populate those tables. The TPC-D benchmark contains 17 queries which have been chosen to have broad industry-wide relevance while maintaining a sufficient degree of ease of implementation.

The TPC-D benchmark is relevant to the present invention in that it is a "decision support" benchmark. Decision support systems differ from OnLine Transaction Processing (OLTP) types of systems, as OLTP typically involves high volume transactions where specific data is searched for, and may be modified as in the case of making an airline reservation. Decision support systems, on the other hand, typically are used for computationally intensive types of analyses, where "trends" or approximations may assist in making decisions. As described in the TPC-D benchmark, the benchmark itself illustrates decision support systems that examine large volumes of data, execute queries with a high degree of complexity, and give answers to critical business questions. The present invention helps in decision support analyses of this type.

The benchmark also specifies in section 2.1.3.6 the required precision of answers, as shown below:

2.1.3.6 The precision of all values contained in the output data must adhere to the following rules:
  a. For singleton column values and results from COUNT aggregates, the values must exactly match the query validation output data.
  b. For ratios, results must be within 1% of the query validation output data when reported to the nearest 1/100th, rounded up.
  c. For results from SUM aggregates, the resulting values must be within $100 of the query validation output data.
  d. For results from AVG aggregates, the resulting values must be within 1% of the query validation output data. From the first precision rule (a), it can be seen that any query that contains COUNT cannot be executed using random sampling nor can it pass the TPC-D precision criteria because the result must be exact. From the third precision rule (c), it appears that queries containing SUM cannot be executed using random sampling because the resultant values must be within a constant ($100) of the actual result rather than within a percentage (e.g., 1%) of the actual result. A 1% result is a very strict standard to meet in using random sampling, because the confidence interval is not specified, thereby implying an expected 100% confidence, which cannot be accomplished using random samples. It may therefore appear that TPC-D is defined so as to prohibit query executions from using random sampling. Applicability to the benchmark does not reflect the utility of this invention to the end user.

However, various TPC-D queries may actually be suitable for random sampling. TABLE 1 below shows which TPC-D queries were found to be suitable for random sampling:

TABLE 1

| TPC-D QUERY NO. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| SUITABLE FOR SAMPLING? | Y | N1 | N1 | Y | S6 | Y | S6 | S4 | S | N3 | N3 | N5 | S6 | N5 | N5 | S | S4 | where:
  Y → sampling can be performed;
  N → sampling can never be performed;
  S → sampling may be performed where the database is large enough;
  N1 → sampling cannot be performed because the query is looking for specific records rather than aggregations; the query could not be executed using random sampling even if the database size were scaled up to a larger database size;
  N2 → sampling cannot be performed because the only result of the query is against a single table, and is a COUNT(*) of which cannot be sampled because once N and n are known, it is known that COUNT(*) is N; the query could not be executed using random sampling even if the database size were scaled up to a larger database size;
  N3 → sampling cannot be performed because the primary key of the 1st table in the join is projected, in this case as part of the GROUP BY key (meaning that individual records must be returned); the query could not be executed using random sampling even if the database size were scaled up to a larger database size;
  S4 → sampling cannot be performed because the number of records which actually need to be examined by the query is too small to make sampling practical;
  N5 → sampling cannot be performed because the number of groups is too large (thus the number of records in each group is too small); the query could not be executed using random sampling even if the database size were scaled up to a larger database size;
  S6 → sampling cannot be performed because the join selectivity is too low to make sampling practical; Query 5 and Query 7 may scale up to a larger database size; Query 13 could possibly scale up to a larger database size.

Referring now to FIG. 6, a QUANTITY attribute from column 250 from a particular table having n records, labeled RECORD(A) 252 through RECORD(n) 254 is shown. An SQL GROUP BY clause may again be used to distinguish among classes, shown as CLASS(A) 256, CLASS(B) 258, CLASS(C) 260, CLASS(D) 262 through CLASS(n) 264. The full set of data in column 250 is grouped into the classes before any sampling takes place. This allows the size of each class to be maximized, thereby providing for a larger sample size which provides more accurate results for each class.

When the QUANTITY attribute in column 250 has been grouped into classes, a random sample is then taken on each individual class 256, 258, 260, 262 through 264. Because the class sizes are as large as the QUANTITY attribute will allow, the random sample will produce the most accurate results possible for any given sample size.

To provide an example, Query 1 from the TPC-D decision support benchmark is shown below:

QUERY 1:
    select l_returnflag, l_linestatus, sum(l_quantity) as sum_qty,
        sum(l_extendedprice) as sum base_price,
        sum(l_extendedprice*(1–l_discount(( as sum_disc_price,
        sum(l_extendedprice*(1–l_discount(*(1+l_tax)) as sum_charge,
        avg(l_quantity) as avg_qty, avg(l_extendedprice) as avg_$_{price,}$
        avg(l_discount) as avg_disc, count(*) as count_order
    from line_item where l_shipdate <=(select t_alpha= '1998-12-01'))
    group by l_returnflag, l_linestatus
    order by l_returnflag, _linestatus To execute this query, all 599,035 records of table LINE_ITEM are scanned to determine which records are within the defined shipping interval. Records within that interval are grouped and the aggregate functions computed.

The expected result has 4 rows total. Because of the GROUP BY command, each row is sampled as a separate population, and there is therefore a separate population for each value combination of l_returnflag and line_status. An empirical result provides for the following populations shown in TABLE 2 below:

TABLE 2

| Population No. | l_returnflag | line_status | No. records in 100 megabyte database |
|---|---|---|---|
| 1 | a | f | 147,556 |
| 2 | n | f | 3,906 |
| 3 | n | o | 291,442 |
| 4 | r | f | 147,581 |

Note that this population detail shows that it is not practical to just sample a table without regard to the populations specified by the GROUP BY clause. A 0.1% sample of LINE_ITEM would be 599 records, which may alone be enough for a statistically accurate sample. However, population No. 2 would statistically include only 4 records, which is not a large enough sample to obtain accurate results. Each individual GROUP BY value indicates a separate population and therefore records must be partitioned according to the GROUP BY value prior to being sampled. Each population must be sampled individually, as was generally depicted in FIG. 6.

Figure 7:
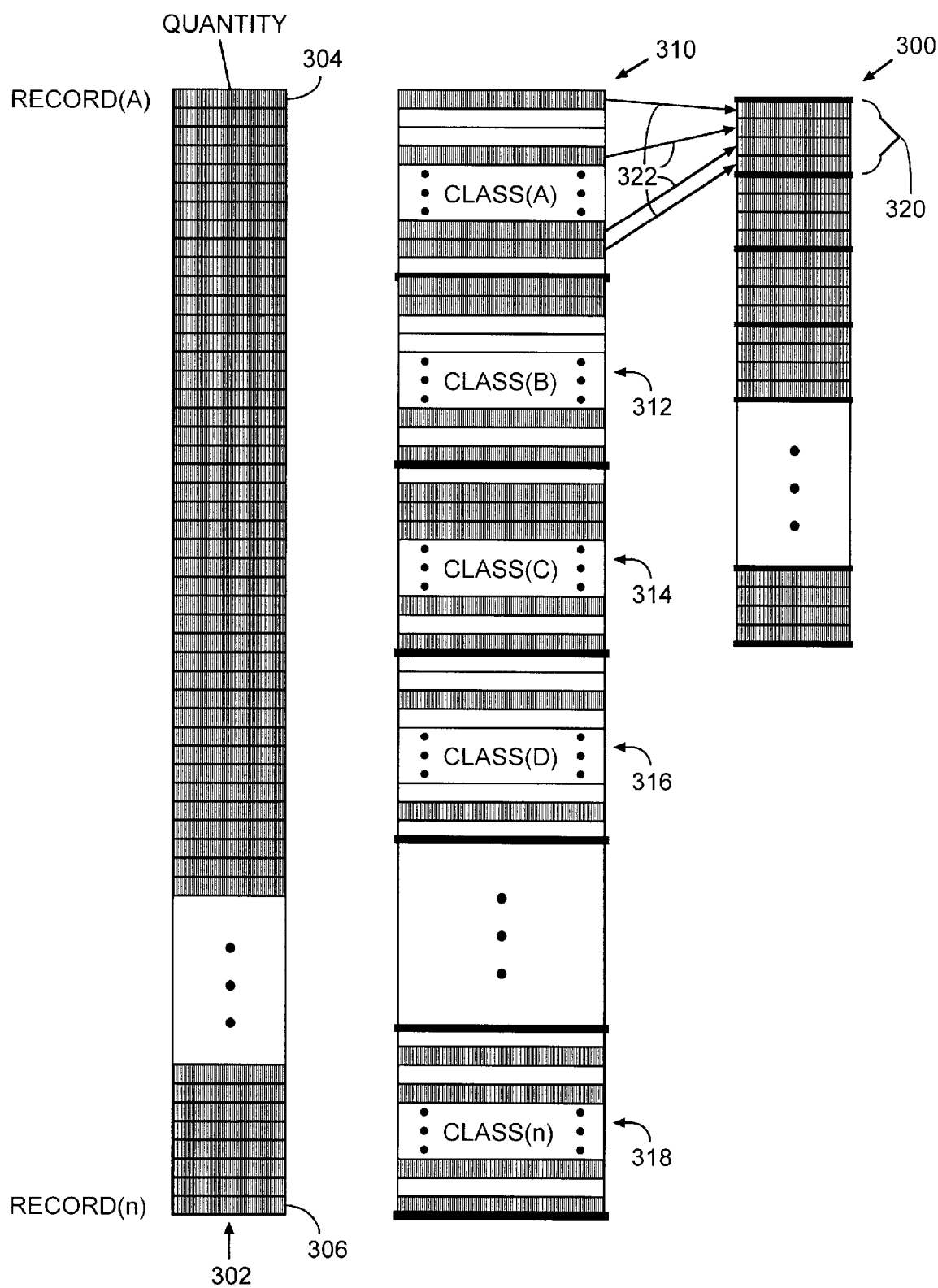
FIG. 7 is a diagram of an embodiment of the invention wherein a separate sample table collects the sampled information in a common place.

FIG. 7 is a diagram of another embodiment of the invention, wherein a separate sample table 300 is used to collect the sampled information in a common place. A QUANTITY attribute is again illustrated, shown in column 302 from a table having n records, labeled RECORD(A) 304 through RECORD(n) 306. An SQL GROUP BY clause may be used to distinguish between classes, shown as CLASS(A) 310, CLASS(B) 312, CLASS(C) 314, CLASS(D) 316 through CLASS(n) 318. The full set of data in column 302 is again grouped into the classes before any sampling takes place, as was also described in connection with FIG. 6. This allows the size of each class to be sized appropriately, thereby providing for statistically meaningful results for all classes.

When the QUANTITY attribute in column 302 has been grouped into classes, a random sample is then taken on each individual class 310, 312, 314, 316 through 318. Because the class sizes are as large as the QUANTITY attribute will allow, the random sample will produce the most accurate results possible for any given sample size.

In the example of FIG. 7, however, the sample table 300 is provided to store the information obtained from the random sample for each of the individual classes. For example, the sampled data from CLASS(A) 310 is stored in the sample table 300 in a table location represented by area 320, the storing of which is illustrated by lines 322. Table 300 similarly stores the randomly sampled data from each of the individual classes into areas within the table 300.

The use of such a sample table 300 provides various advantages, including the ability to re-execute the query from the information stored in the table 300, which would provide the exact same answer as in the previous query. In other words, it allows the same sampled data to be used, rather than always using new sampled data. This is advantageous where a particular result is to be saved, or where it is desirable to perform various aggregation functions on a common set of sampled data. Furthermore, because it takes a certain amount of time to perform the random sampling itself, sampling time can be minimized.

Figure 8:
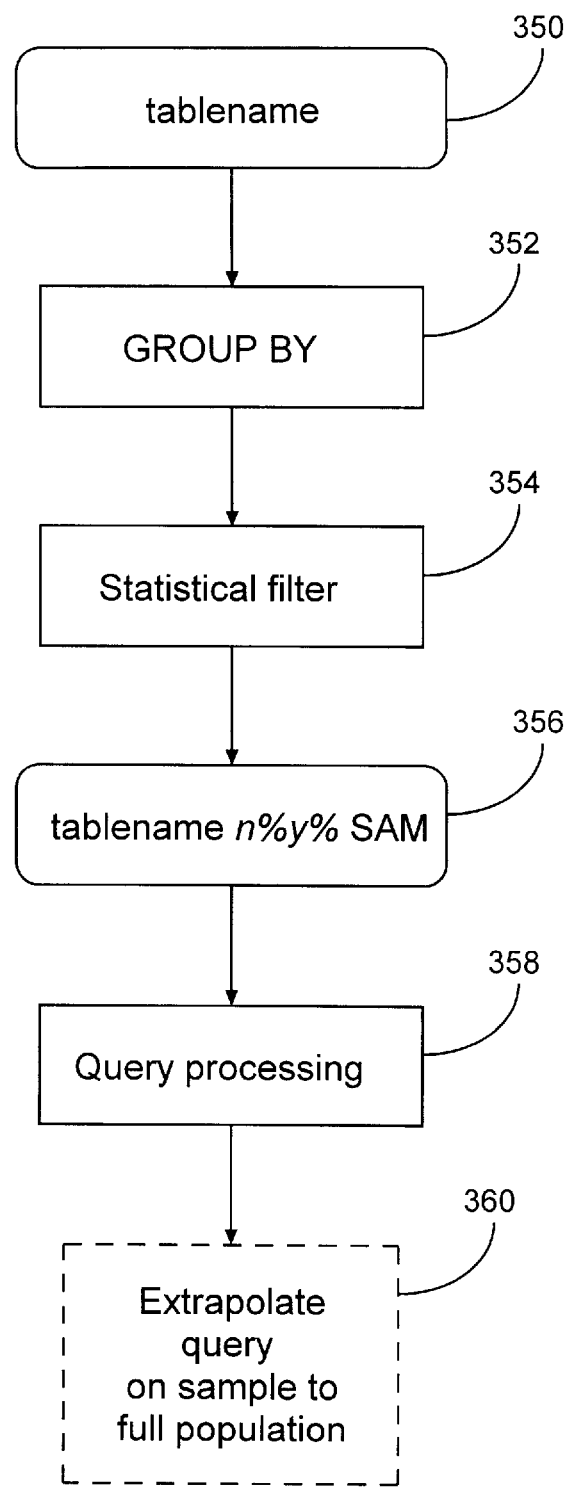
FIG. 8 is a control flow diagram of one embodiment of the invention.

Referring now to FIG. 8, a control flow diagram of one embodiment of the invention is provided. The control flow diagram of FIG. 8 illustrates the process by which groups of data are randomly sampled from a first table, and places into a sample table.

The name of the database table to be processed is "tablename", as seen at control flow step 350. The table is grouped into classes, as is illustrated at control flow step 352. The table is grouped into classes using a database query language grouping clause. In the preferred embodiment, this is accomplished using the GROUP BY clause available within SQL. However, a GROUP BY clause available in other query languages, such as OQL, could also be used in an analogous manner. The sample may be taken on the full data set, which is then separated by class using a query language grouping clause. In such a case, steps 352 and 354 are interchanged, as the random sampling at the statistical filter would occur on "tablename", and the separation into classes would then occur by using a query language grouping clause. In the preferred embodiment, the grouping is executed on the full data set in the table "tablename", and the individual classes are random sampled to provide a greater degree of accuracy.

Each of the classes resulting from the query language grouping clause is randomly sampled at the statistical filter step 354. The random sampling is therefore performed individually on each of the resulting classes in the example illustrated by the control flow diagram of FIG. 8. Various techniques for executing random samples are known in the art. A sample table is created at step 356, where a command SAMPLE TABLE could be used having table creation parameters "tablename n% y% SAM", where "tablename" is the name of the sample table, and "SAM" indicates that it is a sample table such as the sample table 300 of FIG. 7. The parameter "%n" allows the desired accuracy to be entered, and the parameter "%y" allows the desired confidence factor to be entered. Accuracies and confidence factors are well known in statistical analyses.

The query processing step 358 applies the query to the randomly sampled data. A statistical query will use the data from step 356 (e.g., tablename n% y% SAM) instead of the full set of data associated with step 350 (tablename) provided that the accuracy and confidence factors are acceptable.

The optional "extrapolate query on sample to full population" step 360 is a step that recognizes that transformations may have to be made on the results of the query, in order to extrapolate the results to the full data set. This depends on the type of aggregation functions which may be involved in the query. For example, for a query requesting an AVG(n), the average of the sample will be very close to the true average. But if it was a COUNT( ) or a SUM( ), then the results need to be manipulated to obtain the result with respect to the full data set in the table corresponding to "tablename" from step 350. For instance, where a count of a sample is performed where the sample is set to 1%, then the result is extrapolated by multiplying the result by 100 to determine the estimated count of the entire table. Step 360 therefore involves the process of making appropriate adjustments due to the use of executing queries utilizing certain aggregation functions on randomly sampled data.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A method for obtaining decision support query results from a database table having a plurality of records, the method comprising the steps of:
   (a) sampling at least one attribute of the database table to obtain sampled data;
   (b) partitioning the sampled data into data classes, wherein the at least one attribute includes a plurality of the data classes; and
   (c) applying a database query to the sampled data.

2. The method of claim 1, wherein the step of partitioning the sampled data comprises the step of implementing a grouping command of the structured query language (SQL).

3. The method of claim 2, wherein the step of implementing a grouping command of SQL comprises the step of executing an SQL "GROUP BY" command on the at least one attribute of the sampled data.

4. The method of claim 1, wherein the step of partitioning the sampled data comprises the step of implementing a grouping command of the object query language (OQL).

5. The method of claim 4, wherein the step of implementing a grouping command of OQL comprises the step of executing an OQL "GROUP BY" command on the at least one attribute of the sampled data.

6. The method of claim 1, wherein the step of sampling at least one attribute comprises the step of randomly selecting a predetermined percentage of the records in the database table to provide corresponding attribute data.

7. The method of claim 1, further comprising the step of creating a second database table to store the sampled data.

8. The method of claim 1, wherein the step of applying a database query to the sampled data comprises the step of applying the database query to all of the sampled data from all of the data classes.

9. The method of claim 1, wherein the step of applying a database query to the sampled data comprises the step of individually applying the database query to the sampled data associated with each of the data classes.

10. The method of claim 1, further comprising the step of extrapolating results of the database query to all data corresponding to the attribute in the database table.

11. A method for obtaining decision support query results from a database table having a plurality of records, the method comprising the steps of:
    (a) partitioning data associated with a database attribute into a plurality of data groups;
    (b) individually performing a random sample of a predetermined accuracy on each of the plurality of data groups to obtain a corresponding number of group data samples; and
    (c) applying a database query to each of the group data samples.

12. The method of claim 11, wherein the step of partitioning data comprises the step of implementing a structured query language (SQL) grouping command.

13. The method of claim 12, wherein the step of implementing an SQL grouping command comprises the step of executing an SQL "GROUP BY" command on the data associated with the database attribute.

14. The method of claim 11, wherein the step of partitioning data comprises the step of implementing a object query language (OQL) grouping command.

15. The method of claim 14, wherein the step of implementing an OQL grouping command comprises the step of executing an OQL "GROUP BY" command on the data associated with the database attribute.

16. The method of claim 11, wherein the step of individually performing a random sample comprises the step of randomly selecting a predetermined percentage of the data associated with the database attribute from the records in the database table.

17. The method of claim 11, wherein the step of individually performing a random sample comprises the step of randomly selecting a predetermined amount of the data associated with the database attribute from the records in the database table.

18. The method of claim 11, further comprising the step of creating a sample database table to store the group data samples.

19. The method of claim 11, further comprising the step of extrapolating results of the database query to a total of the data associated with the database attribute.

20. A method for providing result approximations in database queries, comprising the steps of:
    (a) partitioning data associated with a database attribute into a plurality of data classes using a structured query language (SQL) GROUP BY command;
    (b) individually performing a random sample on each of the plurality of data classes to obtain a corresponding number of class data samples;
    (c) storing each of the class data samples in at least one sample database table; and
    (d) applying database queries using SQL commands to each of the class data samples in their corresponding sample database tables.

21. The method of claim 20, further comprising the step of extrapolating results of selected ones of the database queries to all of the data associated with a database attribute.

22. The method of claim 20, wherein the step of individually performing a random sample comprises the step of providing an accuracy value to determine the number of individual data selections which must be selected to obtain a desired accuracy within the class data samples.

23. The method of claim 20, wherein the step of individually performing a random sample comprises the step of providing a confidence value to determine the number of individual data selections which must be selected to obtain a desired confidence for the class data samples.

24. A database architecture for obtaining decision support query results from a database table having a plurality of records, the architecture comprising:

(a) grouping means for partitioning data associated with a database attribute into a plurality of data classes;

(b) sampling means for individually performing a random sample of a predetermined accuracy on each of the plurality of data classes to obtain a corresponding number of class data samples; and (c) query input means for applying a database query to each of the class data samples.

* * * * *